US006659815B2

(12) United States Patent
Motsenbocker

(10) Patent No.: US 6,659,815 B2
(45) Date of Patent: Dec. 9, 2003

(54) EFFICIENT MOTORS AND CONTROLS FOR WATERCRAFT

(75) Inventor: Marvin A. Motsenbocker, Fredericksburg, VA (US)

(73) Assignee: Maruta Electric Boatworks LLC, Fredericksburg, VA (US)

( * ) Notice: Subject to any disclaimer, the term of this patent is extended or adjusted under 35 U.S.C. 154(b) by 0 days.

(21) Appl. No.: 10/164,566

(22) Filed: Jun. 10, 2002

(65) Prior Publication Data

US 2003/0060094 A1 Mar. 27, 2003

Related U.S. Application Data

(63) Continuation-in-part of application No. 09/877,196, filed on Jun. 11, 2001, now Pat. No. 6,532,884.
(60) Provisional application No. 60/296,754, filed on Jun. 11, 2001, provisional application No. 60/302,647, filed on Jul. 5, 2001, and provisional application No. 60/349,375, filed on Dec. 22, 2001.

(51) Int. Cl.$^7$ .............................................. B63H 21/22
(52) U.S. Cl. .................................. 440/1; 440/2; 440/6
(58) Field of Search ................................ 440/1, 2, 6, 7

(56) References Cited

U.S. PATENT DOCUMENTS

| 3,548,276 A | 12/1970 | Gross |
| 3,628,112 A | 12/1971 | Gross |
| 3,794,898 A | 2/1974 | Gross |
| 4,243,926 A | 1/1981 | Phillips |
| 4,334,177 A | 6/1982 | Lund |
| 4,355,274 A | 10/1982 | Bourbeau |
| 4,426,606 A | 1/1984 | Suita et al. |
| 4,933,609 A | 6/1990 | Clark |
| 5,039,924 A | 8/1991 | Avitan |
| 5,190,487 A | 3/1993 | Fukui |
| 5,296,797 A | 3/1994 | Bartlett |
| 5,386,368 A * | 1/1995 | Knight ....................... 701/116 |
| 5,418,445 A | 5/1995 | Alpert |
| 5,438,252 A | 8/1995 | Perelle |
| 5,453,672 A | 9/1995 | Avitan |
| 5,575,730 A | 11/1996 | Edwards et al. |
| 5,646,467 A | 7/1997 | Floresta et al. |
| 5,659,231 A | 8/1997 | Svarovsky et al. |
| 5,691,742 A | 11/1997 | O'Conner |
| 5,703,448 A | 12/1997 | Yang |
| 5,790,355 A | 8/1998 | Ishmael |
| 5,814,958 A | 9/1998 | Journey |
| 5,825,099 A | 10/1998 | Kwon |
| 5,833,501 A | 11/1998 | Jones |
| 5,834,874 A | 11/1998 | Krueger et al. |
| 5,837,948 A | 11/1998 | Aulanko et al. |

(List continued on next page.)

OTHER PUBLICATIONS

Hobbs EV Battery Life Extension in Field Testing (SAE Technical Paper Series 970243) Reprinted from Electric and Hybrid Vehicle Design Studies (SP–1243) Feb. 24–27, 1997.
Hobbs Development of Optimized Fast Charge Algorithms for Lead Acid Batteries (SAE Technical Paper Series 1999–01–1157).

*Primary Examiner*—Stephen Avila

(57) ABSTRACT

Electronic control systems, devices and algorithms are described for improving boat efficiency, safety and convenience, particularly for electric motor powered boats. The overall efficiency of electric boat propulsion is improved by matching the needs of the propeller with the magnetic field requirements of the motor. Efficiency also is improved by limiting slip at different boat speeds. Rapid and fully electronic propeller shut off systems also are described for enhancing public acceptance of electric boats and more convenient cruise control systems are described for improving public acceptance of the boating experience.

37 Claims, 4 Drawing Sheets

U.S. PATENT DOCUMENTS

| | | |
|---|---|---|
| 5,847,533 A | 12/1998 | Hakala et al. |
| 5,863,228 A * | 1/1999 | Tether .......................... 440/6 |
| 5,880,548 A | 3/1999 | Lamb |
| 5,928,040 A * | 7/1999 | Wharton ....................... 440/1 |
| 5,961,558 A * | 10/1999 | Kvamsdal ................... 701/21 |
| RE36,459 E | 12/1999 | McVicker |
| 6,051,952 A | 4/2000 | Moreira et al. |
| 6,078,156 A | 6/2000 | Spurr |
| 6,084,325 A | 7/2000 | Hsu |
| 6,094,023 A | 7/2000 | Ericsson |
| 6,137,203 A | 10/2000 | Jermakian et al. |
| 6,184,656 B1 | 2/2001 | Karunasiri |
| 6,215,261 B1 | 4/2001 | Becerra |
| 6,227,918 B1 * | 5/2001 | Wharton ....................... 440/2 |
| 6,348,751 B1 | 2/2002 | Jermakian et al. |

\* cited by examiner

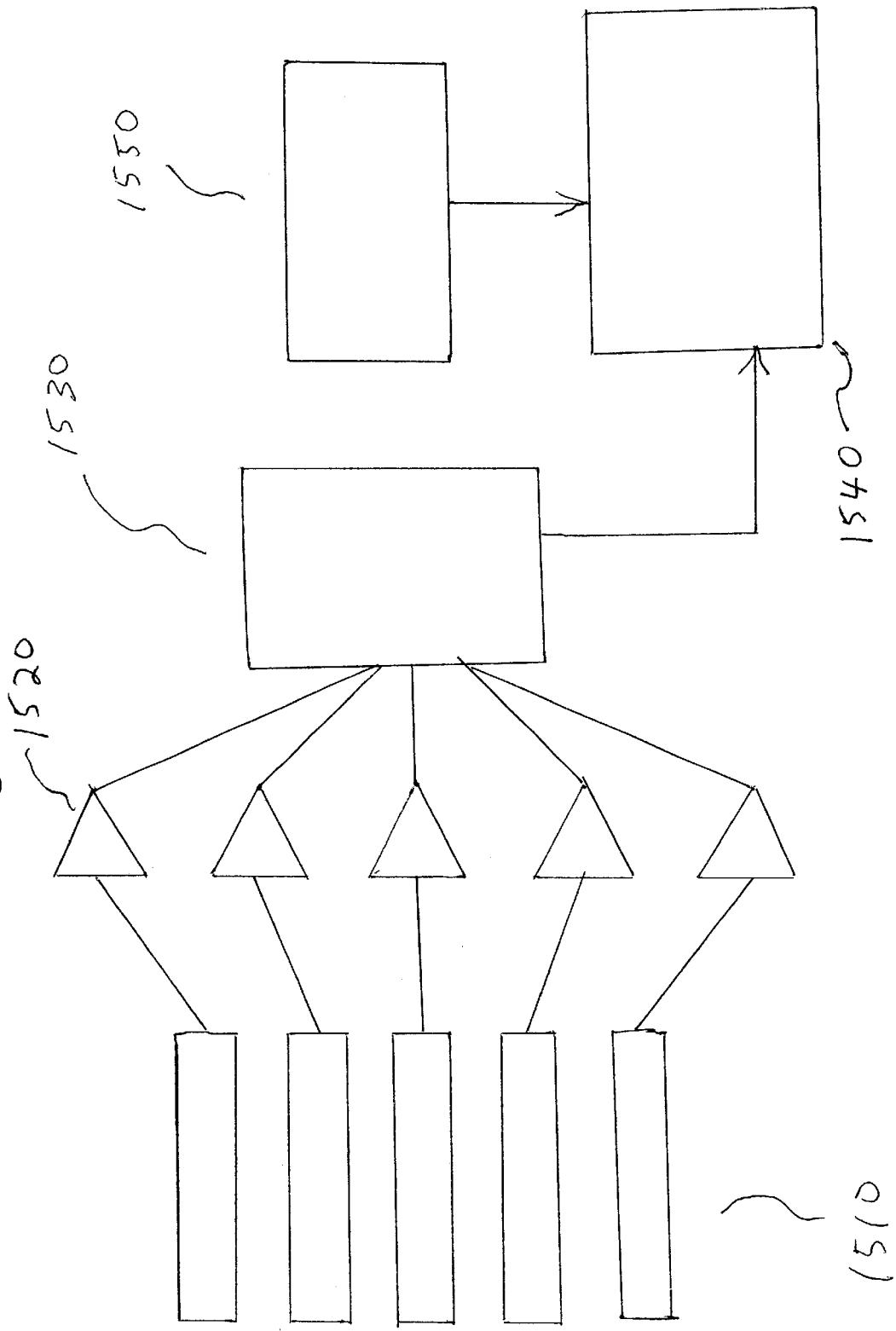

EFFICIENT MOTORS AND CONTROLS FOR WATERCRAFT

RELATED APPLICATION DATA

This application is a continuation in part of U.S. Ser. No. 09/877,196 filed Jun. 11, 2001 now U.S. Pat. No. 6,532,884 and also receives priority from U.S. Ser. Nos. 60/296,754 filed Jun. 11, 2001; 60/302,647 filed Jul. 5, 2001 and 60/349,375 filed Dec. 22, 2001.

FIELD OF THE INVENTION

This invention relates generally to watercraft and more specifically to control systems and motors for watercraft that use electric motors and/or electric control systems.

BACKGROUND OF THE INVENTION

Electric boats once dominated the power watercraft field but became disfavored due to the lower power to weight ratio and lower speed available in electric boats compared to fossil burning watercraft that later developed. Public interest in electric watercraft has resurfaced recently due to their advantages of lower pollution, lower noise, and in some cases elegance, compared with air breathing fossil fueled watercraft. Because of their use of low energy density power supplies such as lead acid batteries, metal hydride batteries, and in the future, fuel cells (including the chemical energy conversion unit) and the like however, electric boats have limited range and speed compared to equivalent sized fossil boats. Accordingly, any improvement in propulsion efficiency of an electric boat would directly ameliorate this problem and improve acceptance of electric boats by the public.

Much electric boat motor and battery technology arose from advances in the electric golf cart and electric car industries. Accordingly, most commercial motors used in electric boats have been designed for those other uses. Many of those active in the electric boat industry use series wound motors and believe that the torque versus speed characteristics of this motor are well optimized for electric boating because the motor speed automatically increases to reach a suitable maximum propeller resistance (Paul Kydd, *Electric Boat Journal* Issue 4, Vol. 6). On the other hand, electronic technologies designed for golf carts, cars and trolleys, such as electrified rails that provide electric power, satellite/roadway navigational aids, automated braking systems, back up radar monitor systems and the like have limited or no use in electric boats. Thus, the electric boat industry cannot rely on aftermarket parts and solutions from these other industries but must invest in and exploit new technologies that solve the particular problems of electric boats.

Improved batteries and motors are the automotive technology advances that seems to relate most to electric boating. Recent developments in permanent magnet direct current motors that utilize high powered rare earth magnets, as exemplified by the Lynch motor taught in U.S. Pat. No. 4,823,039 are greatly welcomed. Such motors are expected to bring great improvements to the industry. However, most motors still are limited to having optimum performance peaks at a narrow or limited range of speed and load. Moreover, even the best motors, which utilize rare earth element high powered permanent magnets generally have low efficiencies at low speed.

A review of advances in the electric motor field would not be complete without acknowledging the improvements made by David Tether, including, among other things, permanent magnet motors having planetary/sun gear arrangements that provide significant advantages for regeneration and for use in watercraft, especially sailboats, as represented in U.S. Pat. Nos. 5,575,730, 5,067,932, 5,851, 162 and 5,863,228. Also, the "ecycle" motor (see www.ecycle.com) promoted and refined by Daniel J. Sodomsky, which has many desirable attributes, with high performance magnets in the rotor and generally high performance overall. These motors alleviate many problems but still, like other motors before them, generally have highest efficiency at a high rotational speed. Thus, a general problem with applying electric motors in watercraft is that motor efficiency drops off at low speed and propulsion efficiency drops off at high speed. The relative lack of discussion of these phenomenon reflects the fact that most motors designers take the problems for granted. It should be noted in this context that shunt wound motors sold in watercraft from the Electric Launch Company of Highlands, New York seem to be controlled by a circuit that independently drives the two coils. However, details of the algorithm used have been kept from the public and the control circuit is sold in a permanent opaque block of epoxy, and details of the circuit appear not to have been published.

Another problem in the watercraft industry that appears to have been overlooked generally in the electric boat field is the need to match propeller slip with boat output at different watercraft velocities. Typically, a fixed propeller of a watercraft is chosen based on optimum performance of a given motor and boat at high speed or at low speed, or a compromise between the two speeds. During use, the operator merely increases power to the motor without regard to propeller slippage until the watercraft reaches a desired speed. This strategy may suit the operation of boats that have a maximum speed of only a few knots and may be appropriate for fossil burning watercraft in an era of very cheap energy. However, high speed personal watercraft, particularly heavy ones that can travel fast may require time to reach high speeds, and excessive propeller slip becomes more of a problem that noticeably affects efficiency of battery use, fuel cell power use and hydrocarbon combustion use in fossil fueled watercraft. Furthermore, the very high propeller slippage condition of cavitation becomes greater as higher revving motors are used to achieve higher speeds. These problems generally have remained unrecognized because the commercial electric boat industry (in particular, pleasure craft less than 35 feet long) focuses on slow boats limited to their displacement hull speeds.

Yet another problem with many electric motors used for watercraft is the mechanism used for removing excess heat. In many terrestrial applications an electric motor is air cooled. In boats, however, the moist and often salty marine environment is inhospitable to many materials used. Special materials and finishes may be required. A particular problem in this regard is when the entire motor is sealed. Trolling motors have been designed that rely on transfer of heat from an exterior case that surrounds the motor, with water. Such motors are generally thought as not very reliable for long term use. In some cases, an enclosed motor case cannot completely contact water, and heat build up is a greater concern. An example of the latter is the motor configuration used by Maruta Electric Boatworks LLC, (www.aquaskate.com) wherein an electric motor is completely enclosed within a sealed hull. As trolling motors become more widely used for a variety of new boat hull designs that limit contact of water with the motor case, removal of heat will become more of a problem. Use of a separate pump with its own electrical circuit and pipes adds an extra level of complexity which undesirably increases costs and presents further opportunity for breakdown. A passive system or simpler system would advance this art.

Yet another problem is that control systems such as auto pilots have been developed primarily for complex operation in larger vessels, where high cost systems have been first adopted and operators are accustomed to training. Simple one button or twist knob analog operation of simple controls such as auto heading is desired by many pleasure boaters who may not want to read an operation manual before using a control.

In sum, boats are very sensitive to propulsion efficiency but most of the motors and their control systems for electric boats have been developed for the automobile and golf industries. Further, present commercial electric pleasure craft are designed primarily for low speed operation and manufacturers have not seriously challenged the limits of motor performance. Any motor or control system that improves the overall efficiency and convenience of pushing a boat would yield rich dividends in extending the performance of the power supply and in gaining further public acceptance of products from this industry, particularly for electric motor powered pleasure watercraft less than 45 feet long.

SUMMARY OF THE INVENTION

During his design studies and construction of practical working examples of electric boats the inventor has made a number of discoveries that directly lead to improved propulsion efficiency and convenience, particularly at low speed. During this work, control systems also were discovered that provide improved propeller safety. These and other advantages of the invention will be appreciated by a reading of the specification.

One embodiment of the invention is an electronic motor control that alters the motor speed/torque output at varying boat speed to more closely match the increasing torque requirements of an attached propeller at increasing boat speeds. One such embodiment of a brushed motor is carried out by altering the armature voltage to change speed, while altering the magnetic field (fixed coil) around the armature, using at least two different magnetic field strengths on the fixed coil, with higher magnetic field(s) at lower rpm and lower field(s) at higher rpm. In a related embodiment, the magnetic field surrounding the armature is altered to at least three values of increasing magnetic strength with increasing rpm. In yet another embodiment the magnetic field is altered to at least 4 values. In yet another embodiment the magnetic field is altered with an algorithm or look up table to determine an increasing magnetic field for a higher rpm range to provide a smoother transition through more than 4 magnetic field strength values.

In yet another embodiment a permanent magnet magnetic field is modified by a superimposed electromagnetic field that optionally may increase the combined field at higher rpm to achieve higher torque and that may be reversed and subtracted from the field at lower rpm to achieve better lower speed efficiency. In yet another embodiment a permanent magnet magnetic field is modified by a superimposed electromagnetic field obtained by two separate electromagnets, which preferably comprise at least one inner electromagnet and an outer electromagnet. At higher torque (greater rpm) the inner magnet is progressively excited and at lower torque at lesser rpm the outer magnet is progressively excited more. In another embodiment the distance between the rotor and stator (or field and rotor) is adjusted to modify the magnetic field(s). In another embodiment the reluctance of the magnetic path between stator and rotor is modified for less magnetic field strength at lower rpm.

Another embodiment is an electronic control method for enhancing the efficiency of electric motor driven propeller watercraft comprising detecting the speed of the watercraft directly or indirectly, detecting the rotational speed of the electric motor, comparing the result of step (a) with the result of step (b) to estimate an expected propeller slip, and adjusting power to the motor to achieve a desired propeller slip. In other related embodiments, the first step is carried out by a procedure selected from the group consisting of detecting a signal or difference from a GSA receiver; detecting a signal or signal difference from a speedometer; and inputting a value from by a computer that monitors one or more electrical variables of the motor such as power, voltage or trip running time; the second step may be carried out by a procedure selected from the group consisting of detecting the motor rotational speed; indirectly determining the motor speed by detecting the current in the motor armature, the voltage of the motor armature, the impedance of the motor armature, the current in the motor field winding, the voltage of the motor field winding, and/or the impedance of the motor field winding; and detecting the propeller speed via magnetic or optical sensing. In related embodiments the desired propeller slip is less than 50%, and the rotational speed of the electric motor is determined by sensing the voltage of the motor power. In another embodiment the motor is adjusted to provide lower slip with faster boat and propeller speeds.

Another embodiment of the invention is an electronic control for enhancing the efficiency of electric motor driven watercraft a having a propeller over a range of speeds comprising a propeller rotation speed signal, a motor power controller, and a comparator for monitoring the propeller rotation speed signal, wherein the controller increases power to the motor by an increment and waits while the comparator detects when the propeller speed signal has reached a steady state or near steady state level, after which the controller increases power again. In further embodiments the propeller rotation speed signal is motor drive voltage, and the comparator repeats incremental increases until a desired endpoint power is reached.

Another embodiment of the invention is an electronic control for enhancing the efficiency of electric motor driven watercraft a having a propeller over a range of speeds comprising a motor power signal, a motor voltage controller; and a comparator for monitoring the motor power signal, wherein the controller increases voltage to the motor by an increment and waits while the comparator detects when the motor power has reached a higher steady state or near steady state level, after which the controller increases voltage again. In related embodiments the motor power signal is motor current, and the comparator repeats incremental increases until a desired endpoint motor voltage is reached.

Another embodiment is an electronic control device that controls propeller slip of an electric motor powered watercraft, comprising a detector of propeller speed, a detector of the watercraft's speed, and a circuit that controls power to the armature of the motor, a field winding of the motor or both, wherein a signal from the detector actuates the circuit to adjust propeller slip according to a predetermined relationship between propeller and boat speed. In related embodiments the detector is selected from the group consisting of a motor speed detector, voltage input to the motor, an optic or magnetic sensor of propeller speed and a computer that monitors power and time to estimate approximate speed; a watercraft contains such electronic control devices; the circuit decreases power to the motor when the propeller speed exceeds a predetermined limit for a given boat speed; the predetermined relationship between propeller and boat speed may be a single value for all boat speeds; and the electronic control device further comprises at least a second control condition that increases the allowable propeller slip to provide higher slippage for greater acceleration.

Another embodiment of the invention is a non-mechanical electronic control system for inhibiting cavitation of a propeller driven electric powered watercraft, comprising a boat speed monitor, and a control circuit, wherein the control circuit monitors motor voltage as an index of propeller speed and decreases motor power when the motor voltage is too high for a given boat speed. In related embodiments the control circuit contains a microprocessor look up table of motor voltage versus boat speed values for use in determining when to lower motor power; and the control circuit further comprises a first electronic comparator circuit or software subroutine that compares the motor voltage with boat speed and a second comparator circuit or software subroutine that compares the results of the first electronic comparator circuit or software subroutine with a reference value and outputs a motor power decrease signal when the comparison shows that the reference value has been surpassed.

Another embodiment of the invention is a simplified heading cruise control for a watercraft, comprising one or more ratiometric output geomagnetic sensors mounted to the watercraft and that output one or more analog signals that correspond to geomagnetic heading, a circuit that analyses the signal(s) from the one or more geomagnetic sensor(s) to output one or more correction signals for altering course, and a maximum of one on/off switch on the watercraft dash required for activating the cruise control. In related embodiments the simplified cruise control further comprises a propeller speed or boat speed signal that automatically turns on the heading cruise control upon exceeding a set speed to allow automatic heading correction at higher cruise speeds; a switch mounted on at least the motor throttle or steering wheel control, wherein activation of the switch turns the heading cruise control on or off; the switch mounted on the motor throttle or steering wheel control is a body capacitive switch that is activated upon electrical contact between skin of the watercraft operator and the throttle or steering control; and further comprises a rotating knob for directly setting a desired course, wherein the one or more ratiometric output geomagnetic sensors are attached to the rotating knob and rotate with the knob.

DESCRIPTION OF THE DRAWINGS

FIG. 4 shows a representative block diagram for using the electronic steering device of FIG. 3.

DETAILED DESCRIPTION OF THE INVENTION

1. Motor Controls and Cooling Designed for Boats, not Cars

The inventor realized that the electric boat industry generally has been copying the electric car industry too much and has neglected important aspects of boat propulsion that limit the use of motors, their cooling systems and control systems as designed for cars. For example, unlike automobiles and golf carts which present a heaviest load to a motor at low speeds, a propeller on a boat at low speed presents very little torque load to a motor but increases load proportionately greater as RPMs increase. A motor designed for automobiles does not increase output power as fast with increasing RPM compared with the needs of a propeller. Also, unlike cars and golf carts, a boat motor always is near a large body of water (an excellent heat sink) when in operation.

The general copying of car systems for much of electric and fossil boating has led, in many cases to suboptimum performance in two areas, 1) power/torque for a given condition and 2) motor cooling systems. Furthermore, problems more unique to boating such as the need for directional control of the vehicle have not been addressed adequately. Embodiments of the invention pertaining to these areas are presented in turn below.

2. Optimum Power/Torque for a Given Condition

Figure 1:
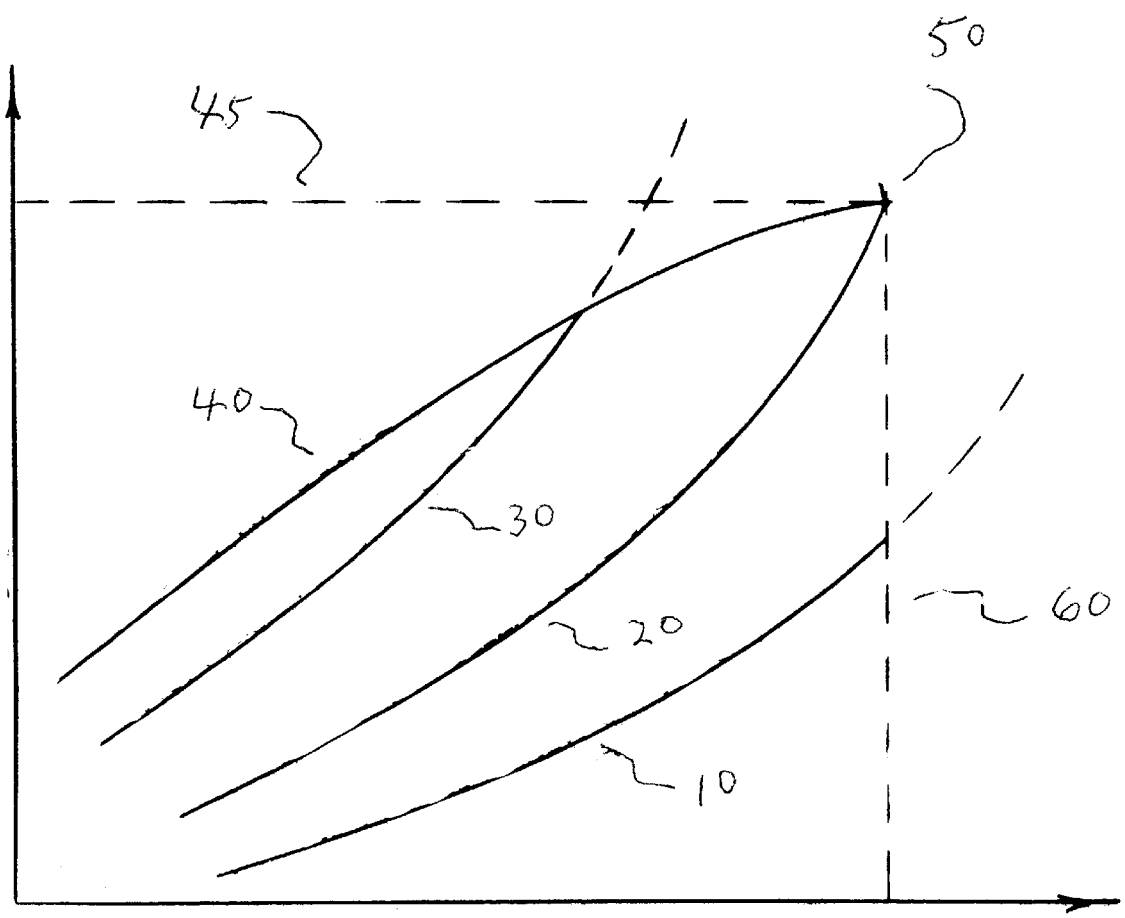
FIG. 1 shows engine and propeller power curves as relative horsepower (increasing up the vertical axis) versus relative revolutions per minute (increasing RPM to the horizontal axis).

The power requirements of a boat propeller with respect to motor output are exemplified in FIG. 1. The X axis of this figure shows increasing RPM. The Y axis shows increasing horsepower. Curve 10 of FIG. 1 shows the power to rotation speed relationship for a propeller that is less than optimum propeller size. Curve 20 shows an ideal power curve for a well-matched propeller and curve 30 shows the power curve for an oversized propeller. These curves show that, regardless of the propeller size, the power needed to drive the propeller increases more than linearly with increase in shaft rpm. In contrast, a typical motor power output increases less than a linear rate as seen by curve 40 until reaching a maximum horsepower (line 45) in FIG. 1. This means that such motors are well matched to a propeller only at one point (line crossing point 50). In fact, a motor typically is matched to meet the propeller power input need at only 70 to 85% of the top rated motor speed. That is, a motor is selected having a power output in a region as seen in FIG. 1 where curves 20 and 40 meet at "max rpm" line 60.

At engine power versus rpm ratios higher than for an ideal match (ideal match as shown in FIG. 1), the engine can produce more power than the propeller can absorb and the propeller will either speed up to create greater slippage in the water and waste energy or the motor will draw less current at the same rpm, and will operate outside of its maximum efficiency power band. That is, a motor may have great efficiency under one set of conditions, but those conditions may only exist for a short time of actual use. This is because for a given rpm the motor is most efficient for a particular power output. Many embodiments of the invention alleviate this situation by adjusting an otherwise constant magnetic field of the motor. Embodiments of the invention improve performance (optimizing slip) by increasing or decreasing power for a given rpm, typically by increasing power for high rpm and decreasing power for a lower rpm. Some embodiments of methods determine a suitable correction for particular desired speed point such as a "sweet spot" for a given motor/propeller combination that an operator tends to use most often. A "sweet spot" refers to the fact that a particular boat configuration has a particular (usually more efficient) performance at that speed, which a boat driver may favor.

In other embodiments, a range of speeds is corrected by an offset factor to adjust (for example) current to an electromagnet to optimize power/RPM for increased torque at higher speed and decreased torque at lower speed. In yet other embodiments a look-up table in a computer is used.

In preferred embodiments the engine HP (horsepower) output is corrected to increase more than linearly with respect to motor rpm. In a particularly advantageous embodiment the HP output increases 5–10% for every 3% increase in rpm. By way of example, if a motor spinning at 1000 rpm and producing 10 hp is increased to 1030 RPM then the motor at the new speed is adjusted to have a power output of between 10.5 and 11 hp. If the motor speed is further increased, the power output continues to increase by this same increment and so on, such that a doubling of rpm will provide a power increase of approximately 350% and preferably between 250% and 400%. In another embodiment field strength is adjusted by physical movement of field magnets (either permanent magnet(s) or electromagnet(s), preferably by solenoid). In another embodiment an electromagnet field coil contains different sections that are separately electrically modulated or switched to achieve differences such as lower field strength at lower rpm to get more efficient behavior over a wide rpm (and boat) speed.

Balancing Magnetic Fields for Greater Boating Efficiency

With the above in mind, the inventor studied and found motor and controller combinations that lead to greater watercraft propulsion efficiency. One discovery was that low speed performance, a boating condition that requires low torque (power to rpm) is improved by modifying the magnetic field strength outside the armature ("field" or "stator") compared with that for high speed performance. Without wishing to be bound by any one theory of this embodiment of the invention, back emf of the motor is thought to inhibit further torque production as a motor increases speed. Decreasing the magnetic field surrounding the armature, by, for example decreasing the current in the surrounding field magnet, or increasing the air gap at higher motor speed reduces the back emf, thus permitting the motor to generate torque at higher speed. Accordingly the air gap is increased, the surrounding magnetic field is decreased somehow, or the ratio of armature magnetic field to the surrounding magnetic field is optimized to accommodate the needs of the boat at different speeds.

With this further insight, the inventor discovered that field weakening of the larger magnetic field would improve efficiency in boating applications. This is because the needed torque at low speeds is very low (with comparison with land vehicles) but increases with speed and the emf begins to more greatly limit the torque that can develop at the higher speeds. This feature is very different from that of electric motors used in automobiles and golf carts. During low speed operation in cars much stronger heavy magnetic fields are required to generate high torque particularly at low speed, whereas torque requirement is not so high at high speed.

In preferred embodiments the field weakening is adjusted (modulated by increasing or decreasing electrical energy) using feedback information from boat speed. By way of example, if an electrical boat speed indicator emits a signal that the boat is going 5 MPH, then a controller circuit would adjust the magnetic field strength (surrounding the armature) to a value appropriate for 5 MPH. A skilled artisan can appreciate also the more sophisticated embodiment wherein both armature field and outside field are adjusted for optimum (highest motor efficiency) for 5 MPH. In one very specific embodiment the armature field and the outside field strengths are kept approximately equal to each other (within 35%, preferably within 15% and more preferably within 7.5% of the same magnetic field as measured or calculated at the middle of the air gap between them) and both are increased as needed for higher boat speed (or decreased together for lower boat speed). In a low cost version of this embodiment electromagnets are used and power (watts) for each electromagnetic field is maintained within this ratio. In this case, the power supplied to the armature magnet and the power supplied to the outside field electromagnet(s) are kept balanced (of similar magnitude with respect to each other) within the above range measured in watts. In another embodiment however, the magnetic field of the field outside the armature is increased proportionately more than the armature field. In this embodiment the power to that field is increased 1–20% and preferably 5–1-% for every 3% increase in RPM, and results in greater than linear increase in torque with increasing RPM. In many instances the current is monitored and/or adjusted to achieve these ratios and field strength is inferred from electrical current.

In other embodiments the surrounding field is high at low rpm and decreases as needed for lower back emf to developed the higher torque needed as the propeller spins faster. One way to implement this is to decrease the magnetic field surrounding the armature at progressively higher speeds. A moderately high field is needed to start the motor from rest and this field is maintained until the back emf of the motor rises sufficiently to prevent further increases in the motor speed. The field strength then is progressively decreased by set values (such as by 1%, 2%, 3%, 5% at a time) and the motor speed monitored (by measuring voltage for example) to determine when the speed reaches a constant lower value (speed initially will be excessively high with high slip in the water) indicating that the boat speed has caught up to the propeller speed and good power transfer exists between propeller and water. Once the desired speed (or target constant rpm) is reached, the field for that particular speed is maintained so that the watercraft continues to run at the equilibrium point where the back emf prevents further acceleration. In preferred embodiments the boat operator will select a desired acceleration rate and/or final speed and the boat motor controller will automatically adjust the propeller speed through a time course to achieve smooth acceleration. In another embodiment, rather than adjust the field by decreasing or increasing its magnetic strength, the air gap between the stator and the rotor is increased or decreased respectively.

The embodiment of altering magnetic field with increasing propeller rpm may be very conveniently carried out by monitoring motor voltage (voltage at the motor itself, preferably) and motor current (or total power, current is easier to measure). Where power to the motor is easily controlled by controlling voltage (most common) the voltage to the motor is increased by a small amount, such as for example 1%, 2%, 3% or 5% of the total range. The motor current (or total power used) is continuously measured. When the propeller slips excessively due to the sudden increase in voltage, the current will be less, and the current will slowly increase again towards a steady state value. As that steady state is approached (or after the current becomes constant) the motor voltage is increased again and the process is repeated. The propeller slowly increases with controlled slip until a maximum value is reached. In an alternative embodiment desired voltage versus current readings are stored in the controller for a given propeller/boat/motor combination. The readings may be supplied by a manufacturer or by making a live calibrator run. In another embodiment instead of controlling motor voltage, motor current (or power) is controlled and motor voltage monitored to determine when a given increase in motor power has resulted in a newer higher settled motor voltage. Here, increasing motor current suddenly may suddenly increase voltage, which may slowly level off to a lower voltage as the propeller begins to slip less and transfer more power to the water. In a related embodiment the voltage or power is automatically increased slowly, as determined by the known relationship with monitoring both voltage and current.

In other low cost embodiments the boat speed is not monitored but a desired boat speed is set by a switch (either manually by the boat operator or automatically by a computer or other control circuit) for a range of speeds. For example, a boat motor fixed magnetic field could be set for "low speed operation" by setting a switch that controls the field outside the armature, or "high speed operation" by selecting a field suitable for higher rpm.

Implement in Series Wound and in Separately Excited Permanent Magnet Motors

Field adjustment can be implemented in a variety of electric motors to optimize for performance at various speeds in a variety of motors. In a series wound motor the "field" coil energy (the coil is outside the armature) is strengthened at low boat speed and weakened at higher boat speed. This adjustment may be carried out by altering the effective impedance of the power supply. In contrast to a series wound motor in a golf cart, that draws highest current at lowest rpm and then draws less current at higher rpm, the same motor driving a propeller will draw less current upon acceleration and the motor will present a higher resistance. In a second embodiment the excitation of a "field" winding of a separately excited motor is altered as desired to optimize performance. In a third embodiment the permanent magnet field of a permanent magnet brushed motor is altered by excitation of an electromagnet fixed coil that produces a field that is aligned with (but of opposite polarity to) the permanent magnet field for higher torque and greater efficiency at high boat speed. At lower desired boat speed the permanent magnet field is augmented by current flow in the other direction, (the fields of the electromagnet and the permanent magnet being the same direction). Preferably the voltage to the motor gradually is increased during acceleration to higher boat speed.

In a fourth embodiment the back emf for a permanent magnet brush less motor is effectively decreased by increasing the space between that field and a surrounding field, by, for example, using two sets of windings in the fixed field, that are spaced at differing distances from the armature, which are differentially used. That is, at higher speeds proportionately greater current flows in the outer winding (compared to the inner winding) and at lower speeds greater current flows proportionately in the inner winding. Of course, three windings or more can be used according to this principle and other permutations of feeding different sections to achieve control can be derived. In yet another embodiment, the current applied to the motor is increased incrementally or by a slight amount (about 1, 2, 3, 4 or 5% for example) until the back emf of the motor (which can be measured as voltage) rises to a steady state, after which the current may be increased again.

In related embodiments active hysteresis-based control of winding currents and/or adjustable air gap is used, as is known or can be derived by a skilled artisan. The use of some of available windings at a time is particularly desirable for modulating the field strength. For example, see U.S. Pat. Nos. 6,348,751 and 6,137,203, assigned to New Generation Motors, which show representative adjustment mechanisms for air gap and coil selection to modify this physical parameter. Also see U.S. Pat. No. 5,880,548 issued to Lamb on Mar. 9, 1999; U.S. Pat. No. 5,837,948 issued to Aulanko on Nov. 17, 1998; U.S. Pat. No. 5,834,874 issued to Krueger on Nov. 10, 1998 and U.S. Pat. No. 5,646,467 issued to Floresta on Jul. 8, 1997. The materials and methods taught in these patents for modifying magnetic field strength and/or flux between rotor and stator represent knowledge of skilled artisans are particularly incorporated by reference and are not repeated here for space reasons. In particular, each of these mechanisms and/or devices may be used to modulate magnetic field and in many cases, particularly the magnetic force from the surrounding stator onto the rotor. In many cases at low speed the field is adjusted higher to achieve the lower torque and is lower at higher speed for higher torque.

In an embodiment the magnetic field strengths of the armature and of the fixed field around the armature are kept within 35% of each other (measured or calculated at the center of the air gap between them) and both are increased together (staying within 35% of each other) for increased boat speed. Preferably the field strengths are kept within 15% of each other and more preferably within 7.5% of each other. In a particularly advantageous embodiment however, the fixed field outside the armature is kept at a fairly high level upon first turning on the motor to provide increased torque to overcome the inertia of the drive system. Most preferably that field is at a high power (exceeding at least 10% of that used for full speed power, preferably exceeding 25%) upon startup and at very low speeds, for example, at less than 100 RPM speed. That is, the principle enumerated herein of adjusting the fixed field has to give way in some instances to the need for a greater torque to begin rotation, particularly for systems that utilize belts and gears and which have high friction at startup and very low speeds.

A skilled artisan, armed with this information can build or modify a motor to adjust a magnetic field in the motor, and particularly around the armature as desired for greater low speed performance. The automobile, elevator and golf cart motor patent literature contains many examples of circuits that can be adapted to this end and the use of those techniques specifically is contemplated. For example U.S. Pat. No. 5,703,448 describes the use of electromagnetic windings with taps that allow intermediate power levels of excitation. Another patent, U.S. Pat. No. 4,334,177 teaches the control of both windings by alternately switching between them using low cost parts. Reexamined patent No. 36,459 shows a control algorithm (see FIG. 1 of that document) which is adjustable and which could be adapted for the present invention to achieve a desired torque/speed performance. A microprocessor can be used for control using, for example pulse width modulation of an armature and H bridge by using the tools described in U.S. Pat. No. 5,039,924. The latter patent teaches how the use of current sensors for feedback and adjustment of voltage applied to a motor armature and/or motor field coil. FIG. 1 of that patent shows how to adjust speed vs torque using basic electrical parameters, and such adjustments can be used for embodiments of the present invention. Each of these patents is specifically incorporated by reference in its entirety.

A more complicated electronic system that could be used for control is described in U.S. Pat. No. 5,453,672, which teaches to multiply measured armature current in a brushed motor by a fixed optimal field constant to generate an optimal field current signal. This system can be used to generate a field current error signal to adjust motor power. The technique could be adopted by combining information about propeller speed and torque to adjust a motor according to embodiments of the invention. When using a separately excited motor, the armature current can be monitored to determine the status and/or performance of the propeller. Above a threshold armature current, the field current would be adjusted for higher torque to give better performance. Such adjustment is described in U.S. Pat. No. 5,814,958.

In an embodiment of the invention the armature current is monitored to create a signal, and this signal is massaged or multiplied to produce a correction signal that adjusts the field current as the armature current increases. Most preferably, a multiplication factor is determined or set (using a potentiometer or a computer) according to a given propeller. That is, when a new propeller is used, a calibration is carried out to determine an optimum adjustment to the field strength. In one such embodiment speed and power measurements are made at two field strengths, and preferably at three field strengths or more. The performance (typically power input to the motor versus boat speed) at each field strength is measured and the results used to set the field strength error correction factor or algorithm for a given propeller. The correction might also be reset (or stored values inputted for later use when conditions change) for additional conditions such as light versus heavily loaded boat.

Other electrical modifications that optimize the torque needs of a propeller to the boat speed via the electric motor may be carried out for other motor types. For example, U.S. Pat. No. 4,243,926 describes the detection of motor loading and adjustment of a voltage to an AC induction motor to compensate. U.S. Pat. No. 4,355,274 describes a voltage control system for an induction motor consisting of a SCR AC voltage controller with sensing and control circuitry that adjusts motor voltage in response to load torque demand, thereby minimizing the motor's magnetizing current and its associated losses. Such electronic manipulations are contemplated for use with AC induction motor driven propellers as well. In an embodiment of the invention a controller for an AC induction motor is adapted to increase torque suitable for a propeller.

In a preferred embodiment, upon installation of a new propeller a user obtains data at various speeds and/or motor power inputs to adjust the performance of the motor to increase torque with rpm according to the type of propeller, the type of boat, and even the degree of loading according to the principles and figures enumerated herein. For example a single phase induction motor having two windings can be controlled by setting a suitable torque by controlling voltage for speeds below the synchronous speed (set by AC line frequency) wherein the controller adjusts the amplitude phase angle relative to the line winding, and the frequency of the voltage for a desired response as exemplified in U.S. Pat. No. 6,051,952. The controller also could selectively switch power to the line winding for a different operating mode with both windings at below synchronous speed. The controller can also open the connection to the line winding after starting and operate the motor via the control winding at any speed by adjusting the frequency and amplitude of the controller voltage as described in that patent. In each case, information about the propeller performance preferably is used to determine optimum control settings.

Most preferably, in each case, propulsion unit efficiency is determined over a wide range of boat speeds and an optimum cruising speed (which may be affected by the particular propeller chosen) is determined. Upon choosing the cruising speed, the circuitry controller, which may be hardware configured or under control of a computer program, is adjusted for best performance at that boat speed. In most embodiments such adjustments will modify magnetic field strength by changing voltage, current, frequency, wave form phase shift, or a combination of these to get a suitable torque for a given rpm. In practice, however, a user does not have to actually measure or know rpm or torque value, but the optimization may be carried out by monitoring power consumption for different speeds.

Motor Adjustment for Desired Propeller Slip

Embodiments described above improve propulsion performance by adjusting power for a given rpm according to numerical guidelines, or according to results obtained by testing the performance of a particular propeller and motor combination. However, improvements also may be achieved by controlling the motor for optimum measured propeller slip.

Adjusting propeller slip is helpful because merely adding power to a propeller often will cause the propeller to slip excessively through the water until the boat speed catches up. That is, increasing power to a boat propeller that is already well loaded at a steady slip (steady speed) will cause an increased slip until the boat reaches the new speed. Although propeller slip is necessary for thrust and for acceleration, the inventor rationalized that a high slip is less efficient than a smaller slip needed to maintain speed and that the amount of slip can and should be controlled to improve efficiency of consumer electric boating. Furthermore, the optimum propeller slip is smaller at higher speeds than at lower speeds.

Figure 2:
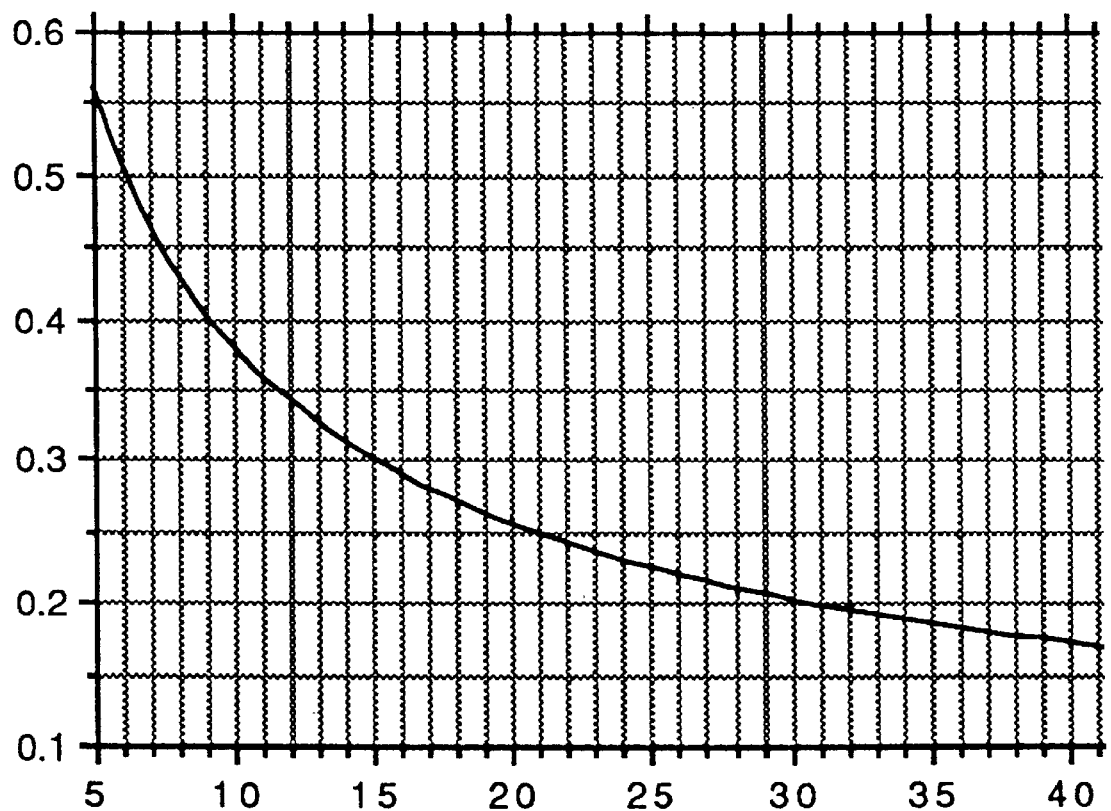
FIG. 2 shows a desirable propeller slip (vertical axis) versus boat speed (horizontal axis).

FIG. 2 depicts optimum propeller slip as a function of boat speed for various boats. The X axis is increasing boat speed in knots and the Y axis is increasing slip. As seen in this graph, slow moving boats tend to have higher propeller slips of as much as 50% but boats at higher speed optimally should have much slower propeller slip. For example, a 10 knot boat should have a more efficient propulsion at about 37% slip and a faster boat of 20 knots should have about 25% slip. The inventor discovered that he could obtain greater acceleration efficiency if the propeller speed is kept less than 1.5 times, preferably less than 1.35 times and more preferably less than 1.1 times the optimum slip values shown here for each boat speed by electronic control of magnetic field strength. That is, compared with the common practice of setting an electric motor to full throttle until the boat reaches a maximum speed, the inventor came up with devices and methods for ramping up an electric motor speed and provide more efficient acceleration. The embodiment of limiting propeller slip of electric motor driven watercraft during acceleration will become increasingly useful as electric watercraft are commercialized that achieve greater speeds.

Some embodiments of the invention limit slip while providing acceleration to higher speeds for best efficiency. In an advantageous embodiment propeller slip for a given speed, as determined from the chart in FIG. 2, is maintained according to a desired speed (as seen in the horizontal axis of that chart) by manipulating power to the motor, such as described herein. In one embodiment motor power is controlled to limit slip to less than 150% of the value shown on the vertical axis of the chart for a given speed and in another embodiment slip is limited to less than 135% of the value. In still another embodiment slip is limited to less than 125% or even 110% of that value. By way of example a 15 knot target speed might have a propeller slip limited to 0.45 (135% times 0.3) or 0.33 (110% times 0.3). The degree of limitation is best determined by factors such as how fast the user wants to accelerate and the actual optimized situation for the boat/propeller combination because each combination will differ slightly in practice.

In preferred embodiments magnetic field(s) of the motor are adjusted at one or more "sweet spots" of the speed curve for a given boat, boat loading and propeller combination. One sweet spot is a low speed below (within 5% to 25% below) the maximum displacement hull speed, as determined by the length of the waterline by the formula 1.33 times the square root of the waterline length as is known in the industry. Another sweet spot is the most efficient point for a hydroplane capable boat within its hydroplane speed. Still another spot for optimization is the maximum power output point of the motor. Even at high output it is useful to check the propeller slip and modify the motor electrically to achieve a more desirable slip for improved performance. This is conveniently carried out by monitoring motor current increase for a given voltage increase. If the motor increase value starts rising the propulsion efficiency suffers. This embodiment of the invention provides a set of target slip values for altering the torque to rpm curve of a given motor and propeller combination, and uses constant monitoring of propeller and boat speed to adjust those values.

In a preferred low cost embodiment the operator of the boat manually optimizes a motor parameter (such as strength of a magnetic field surrounding the motor armature) and then fixes that value into a circuit (typically by adjustment of a potentiometer) or into a computer so that the optimum value can be selected for use at that desired speed. This is carried out for each desired speed, such as a high displacement speed and an efficient spot of a hydroplaning speed, if the boat is capable of hydroplaning. In one such embodiment the motor torque is adjusted by adjusting a fixed magnetic around the armature to provide optimum torque and maximum efficiency. For an AC induction motor suitable electrical characteristics may be modified as exemplified in the discussion above. During use, such optimum conditions may be set by a switch or some other automated means. In an example of setting a switch for a high displacement speed, the user may simply push a button that sets the matching motor condition. Likewise a switch may be used to select other desirable set points.

Of course, in another embodiment the (normally fixed) magnetic field may be adjusted continuously in a pattern determined by the propeller/boat characteristics so that the user merely uses a continuous speed throttle to set one parameter (such as voltage to the armature for a brushed motor in a simple motor example) and the magnetic field outside the armature changes (rises or falls) according to preset steps and/or a preset linear relationship with rises in the armature voltage or (more preferably) current. In a particularly desirable embodiment a computer controls the fixed magnetic field around a brushed armature. A computer uses a look up table of values that yield a power versus rpm relationship similar to that shown in FIG. 1, which is determined beforehand for a particular propeller either by the manufacturer or by the user of the boat.

In an embodiment of the invention the propeller slip is determined by measuring the boat velocity and the propeller rotation speed. The determination of slip or more realistically, relative optimum slip is best made from practice tests with a given propeller. In some embodiments of this aspect of the invention a numerical ratio of slip is not actually calculated but relative slip is used to adjust the motor power. That is, the power consumption is determined at a given boat acceleration rate and an optimum power is chosen to set the value for a computer program or hardware so that the boat operator can select that optimum value when desired.

In a preferred embodiment of the invention propeller speed (in rpm) and boat speed (in other units) are measured continuously and compared. Depending on the comparison results, the motor is adjusted to bring the propeller speed to a more desired speed. Propeller rpm can be readily determined by direct measurement from a tachometer that may be built in or added to the motor, by optical means, magnetic means or from motor voltage. One easy magnetic means is to attach a magnet to the propeller shaft or propeller hub and to place a hall effect sensor nearby to detect movement of the magnet near the sensor. Boat speed can be measured by a large variety of devices but preferably by a device that generates an electronic signal which can be readily compared with the propeller speed signal. A comparator then compares the two signals and outputs a control signal to the motor as needed. The comparator can work with a computer that has stored information for desired rpm versus boat speed or the comparison can be entirely in hardware, or even involve different comparisons for different speed ranges. For example, a stepped planing electric boat has very different rpm vs torque needs at high planing speeds and a separate comparator or look up table may be used for the planing speed region compared to low speed operation.

In a less preferred embodiment where it is not feasible to constantly measure propeller and boat speeds a power input versus boat speed curve is determined empirically and used to determine optimum adjustments. Each point on the curve represents an optimum slip for that propeller at the given speed. According to an embodiment, the boat speed is continuously monitored and a motor power that slightly exceeds the power/speed ratio for that particular speed is applied to the motor for acceleration. Up to 10% excess power may be used to accelerate above that speed while up to 20%, 30%, 50% or even 100% excess power may be used in some circumstances where efficiency is progressively less of a concern. Of course, when starting from rest, the boat requires a much higher slip outside this range to achieve a minimum speed. For example a very high slip may be acceptable to get the boat up to the hull displacement speed to save time. However, in another embodiment where time is less of a concern, (for example during a distance/endurance contest) the higher efficiency method of limiting slip may be applied at boat speeds as low as 2 knots or less.

A number of devices and methods can be used to implement this embodiment of the invention. In one preferred embodiment a controller device is set to a maximum speed and the device outputs a motor control signal that sets the motor speed to allow propeller slippage of up to 30% more than the optimum slippage, preferably only up to 20% or more preferably up to 10% above the optimum slippage. Generally, in many embodiments a hardware circuit or computer memory used in calibration mode detects control voltages or currents and saves those values for use in regular run-time mode.

Cavitation: Extreme Propeller Slip

In extreme instances the propeller will slip so much as to cavitate. Cavitation of fossil fueled boats has been measured directly by, for example, a bubble detector as described in U.S. Pat. No. 5,190,487. However, such use of a bubble detector is undesirable because it is prone to error and introduces a layer of complexity to the equipment, having to be maintained in a marine environment. Another means of detecting cavitation has been with a pressure sensor, such as described in U.S. Pat. No. 5,833,501. The pressure sensor system also is unduly complicated and difficult to maintain. These mechanical systems were designed for use in conjunction with internal combustion engines and are not preferred for the present invention. However, in one embodiment an inexpensive and robust pressure detector made from a piezo film such as that available from Measurement Specialities, (Valley Forge, Pa. USA, website: www.msiusa.com) may be used to detect cavitation.

A preferred sensor for detecting cavitation directly or for inferring boat speed is a metallized piezo film, which is built thin, flexible, is robust and inert, is broadband with a low Q, but having a high piezo activity of for example, d10 to d100 and more typically d20 to d50. One or more such sensors may be mounted neat the propeller and used to detect cavitation by sensing pressure waves. In a preferred embodiment a circuit compares a motor power signal with a piezo detected pressure signal. If the pressure sensor output indicates that the propeller is not generating a suitable pressure differential (measured using one sensor, or optionally more than one) for a given motor power or speed then the circuit outputs a "cavitation present" signal, which triggers lowered power to the motor.

In another preferred embodiment propeller speed is determined by motor voltage and boat speed is determined by a speed sensor such as a simple piezo electric device. Signals from both sensors are compared and if the propeller speed signal is proportionally too big then the motor power is cut back. A variety of boat speed sensors may be used. However a non-moving sensor such as a piezo electric device, in combination with motor voltage (which is NOT a sensor) is a particularly robust, reliable and inexpensive combination for the comparator. In this embodiment, NO moving parts are used to determine cavitation. On the one hand a piezo electric device such as a metalliized film is not particularly accurate for determining a precise boat speed. On the other hand, the boat speed value does not have to be very accurate and the piezo electric signal, while not easily usable for reporting boat speed, is sufficient for this embodiment of the invention. A motor voltage needs to be compared with a rough estimate of boat speed (very slow less than 2 mph, about 5 mph, about 10 mph, about 20 mph etc) for determining cavitation on this basis.

In contrast to the prior art mechanical systems, these embodiments of the invention are completely electric and monitor cavitation directly by piezo pressure sensing, by monitoring propeller speed, or by electrically sensing the motor itself to determine whether the motor has entered into a speeded-up state characteristic of cavitation. In a very desirable embodiment the propeller speed is directly measured without using a sensor but instead merely taking the motor voltage. This embodiment is preferred for most electric motor driven watercraft because of its reliability and low cost. Upon sensing cavitation, a circuit electrically decreases power to the propeller. In one embodiment the motor speed is inferred by monitoring current supplied to the motor and a motor speed value compared with a known or estimated boat speed. A sudden decrease in current below a defined rate of change indicates cavitation. A device that detects this condition may sense current through the armature in a brushed motor or through a field winding in a brushless motor and then output a signal in response to an above threshold decrease in current per unit time under steady voltage conditions. The outputted signal adjusts the supply voltage and/or current downwards, decreasing motor power (watts).

In one embodiment a computer monitors the cavitation (excess slippage) signal. In a preferred embodiment the signal is compared in hardware and is generated over a moving time interval established by a circuit time constant and automatically adjusts the power supply downwards. In yet another embodiment the boat speed and propeller speed are monitored as described above and an overspeed condition, defined as an excessive slip ratio, which may be a relative measurement, indicates cavitation. In a particularly advantageous embodiment the propeller speed and motor electrical (current, voltages etc) characteristics are monitored and compared with normal speed and characteristics. If the motor characteristics are outside a normal range, then the motor power is adjusted.

The High Speed Low Efficiency Problem

A problem that affects displacement vessels such as most electric boats used for pleasure is that the propulsion system efficiency rapidly drops off as the watercraft approaches hull speed. An embodiment of the invention addresses this problem by monitoring motor current and limiting boat motor power when the current starts increasing too much for a given increase in propeller speed. It was noticed that at low, efficient speeds (e.g. at 10%, 20%, 25%, 30%, 50% or 70% of hull speed) the electric watercraft motor current increases fairly linearly with increasing speed. As the boat approaches hull speed (typically becomes within 75%, 80%, 85%, 90% or 100% of hull speed) the current consumption starts to rapidly increase. In this embodiment of the invention, the motor current is monitored and when the increase in motor current versus increase in motor voltage exceeds a nominal value (determined by for example increase in current for a given increase in voltage at 30% of hull speed) the motor power is set back. Each motor/propeller/boat combination is associated with a general acceptable current increase versus voltage increase ratio in low speed conditions. An arbitrary increase in this ratio, such as 1.2; 1.3; 1.5; 2.0; or 3.0 times increase in current for a given increase in voltage indicates a low efficiency speed operation, which triggers an alarm such as a bell or buzzer, and in some embodiments, an automatic limitation in speed for greater efficiency of power usage.

Safety Control Device for Suddenly Stopping a Propeller

Another embodiment of the invention is an electronic device and method for preventing collision of swimmers or other marine life with the boat propeller. The device monitors space near to and upstream of the propeller and automatically stops the propeller upon detection of an approaching object. This embodiment consists of two devices, which may be combined into a common circuit. The first device is a sensor and sensor circuit for detecting the approach of the object. The second device is a circuit for rapidly stopping the electric motor.

A large variety of sensors may be employed to constantly scan the water/and or air space above the water immediately in front of the propeller during propeller motion. Galvinometric devices can be used for the invention by measuring conductivity in the water and detecting the appearance of a body volume that differs in conductivity. Galvinometric (conductivity) measurements however, are disfavored due to the need for filtering to remove unwanted signals such as produced by wave and bubble activity.

A more preferred method is to use piezo electric sensing within the water, with at least one piezo device as a transmitter and at least one piezo device as a receiver. In a most simple arrangement, flat sensors are mounted on the boat hull and the transmitter constantly sends out a signal. The receiver constantly reads a reflection signal, and a difference in the received signal (increase in reflected signal compared to a previous background signal) indicates movement of an object. Such a primitive sonar system should be tuned to detect only signals reflected in the vicinity, preferably less than 10 feet, more preferably less than 5 feet and most preferably less than 3 feet away. In an advantageous embodiment 2 transmitters and 2 receivers are oriented to transmit or sense signals that are reflected from objects positioned laterally off the port and starboard sides near the boat rear in front of the propeller, respectively. In one embodiment however, two transmitters may be used to emit signals sideways off the side respectively, and at least one receiver may face down. An object that enters the sonic field on either side respectively reflects sound waves down and then off the bottom back up to the receiver.

Preferably one or more piezo transmitters are positioned on the sides of the boat at an angle between 0 to 45 degrees below the horizon (water surface) towards the bottom and more preferably between 15 and 45 degrees below the horizon. One or more receivers may be positioned near the transmitters and, in an embodiment, a receiver and transmitter are incorporated into the same device, such as a thin film that may be mounted on a hull. Wires from the piezo devices preferably pass through the hull behind or near the sensor devices.

This system may be turned off while maneuvering next to a dock and the system's sensitivity may be electronically adjusted to sense minimum sized objects to prevent energizing upon detection of small debris within the water. Sonar used for detection of fish and bottom structures may be modified for implementing this embodiment of the invention.

Another type of sensor uses infrared motion detection to trigger the second circuit for rapidly stopping the motor. Infrared detectors are well known but are sensitive to ambient environmental heat sources, including direct or indirect sunlight. In an embodiment a second sensor is used to help correct for the effects of such environmental noise. Yet another type of sensor is an ultrasonic motion detector mounted in the air above the water. Again, with this type of sensor, an important factor will be noise caused by the environment. Preferably a filtering circuit is used to remove signals created by waves in every system.

The second circuit for rapidly stopping the motor is triggered by the detector, and rapidly halts the propeller. In preferred embodiments the direction of an electromagnetic field of the motor is reversed by reversing the polarity of the electric current flowing through the electromagnet until the motor has come to a stop, or a near stop (preferably less than 100 RPM, more preferably less than 30 RPM and most preferably less than 10 RPM). In the instance where the propeller is driven by a separately excited brushed motor the polarity of the fixed coil (outside the armature) is reversed and the back emf or the motor (or motor/propeller rpm) may be monitored until the speed has dropped to zero or below a low detectable value.

In the case of a simple permanent magnet motor, the motor kinetic energy may be suddenly absorbed by a circuit which shunts the drive leads to a low resistance. Preferably the polarity of applied voltage is reversed, in a manner that does not overstress the motor. Numerous techniques for rapidly braking an electric motor are known and contemplated for this embodiment of the invention. Examples of such control systems may be found, for example, in U.S. Pat. No. 6,094,023 (Method and Device for Braking an All-mains Motor); U.S. Pat. No. 5,847,533 (Procedure and Apparatus for Braking a Synchronous Motor); U.S. Pat. No. 5,790,355 (Control System); U.S. Pat. No. 4,933,609 (Dynamic Control System for Braking DC Motors); U.S. Pat. No. 3,628,112 (Dynamic Braking of Electric Motors with Load Changing During Braking); U.S. Pat. No. 3,548,276 (Dynamic Braking of Universal Motors); and U.S. Pat. No. 3,794,898 (Dynamic Braking of Electric Motors with Thermistor Braking Circuit), the contents of which specifically are incorporated by reference in their entireties.

3. Motor and Battery Cooling Systems

The electric boat industry that uses motors in contact with water has not faced squarely the dilemma of requiring water contact with the motor to remove waste heat, while at the same time, minimizing that water contact to decrease friction that interferes with boat movement. Ideally, an electric boat should interact minimally with the water and should (particularly at higher speeds above the hull displacement speed limit) not excessively perturb the water with a protruding motor. At low trolling motor speed conditions, the extra drag caused by a trolling motor is often not a concern, but as the electric boat industry develops this phenomenon is becoming a more important limitation.

One way to decrease drag using a trolling motor is to incorporate the motor in a Maruta (TM) design for higher speed electric watercraft. While adapting trolling motors for use in prototype Maruta hulls the inventor discovered that the axle of such motor generally is the first part to receive waste heat, despite the fact that the motor is design to transfer heat through the metallic casing to the surrounding water. That is, heat more readily transfers to the axle, not the casing in many situations, yet the casing is used to transfer the waste heat. In studying this problem, several new conformations of motor design and axle design were discovered that utilize the axle more fully to dissipate heat, allowing greater design flexibility for the motor case and in some cases allowing design of the motor casing into the boat surface. In an embodiment the motor case is modified to allow greater hydrodynamic matching with hull design while allowing good water contact to dissipate the heat. In a related embodiment, batteries that can be charged rapidly but which generate much waste heat are mounted in the hull to allow good thermal contact with the water.

In an embodiment, an electric motor axle is made long enough to provide a large contact surface with a conductive propeller. In common designs used most often for small electric motors such as those sold by Minn Kota and Motorguide (2 hp, 1 hp, 0.5 hp or less) the motor axle extends out of the case through a seal and a simple connection with a threaded portion of the axle is made to a non-thermal conductive propeller. In a particularly advantageous embodiment of the invention, in contrast, the motor axle extends further along the length (fore/aft) of the propeller and contacts the propeller through a larger distance. The axle extends and (more importantly contacts) at least ¼ inch, preferably at least 0.4 inch, 0.5 inch, 0.75 inch, more preferably at least 1.0 inch, 1.25 inch, 1.50 inch or even greater than 2.0 inches of a propeller hub wherein the propeller is made from a thermoconductive material. The propeller thermoconductive material may for example, be metal such as aluminum or brass, plastic or other thermally conductive polymer, or a ceramic material and has an opening in the center that thermally contacts the motor axle. Preferably the thermal contact occurs through a bore in the propeller that preferably is at least 0.5 inch, 0.75 inch, more preferably at least 1.0 inch, 1.25 inch, 1.50 inch or even greater than 2.0 inches of the propeller central region "hub."

In another embodiment, heat transfer is facilitated by an increased diameter of the axle outside of the motor on the propeller side to allow greater heat transfer to the propeller. In yet another embodiment the axle increases in diameter from a narrow diameter at the end away from the propeller to the propeller end. In yet another embodiment the motor case contacts water and the axle transfers heat through a large contact with a conductive propeller as described here. Although most previous sealed electric motors are trolling motors of less than 2 horsepower, embodiments of the invention that utilize the motor axis for at least some cooling are used for electric motors of at least 2 hp, 3 hp, 5 hp 10 hp, 25 hp and even above 50 hp. Without wishing to be bound by any one theory of this embodiment of the invention, it is thought that much heat is generated on the axle (via the armature windings, when used) and, in some cases is transferred to the axle from a surrounding electromagnet. The axle, which may include a permanent magnet or an electromagnet, generates much heat directly in some motors and certainly can absorb heat from other parts of the motor.

In another embodiment of the invention the motor axle is hollow and water flows through the axle, cooling it. In these embodiments, a particularly useful motor is one wherein the axle has a large diameter of at least 1 inch, 2 inches, 3 inches 4 inches, 5 inches, 8 inches or even greater than 12 inches. The axle may be a wound armature that receives power with brushes and surrounded by magnets or the axle may comprise permanent magnets and be surrounded by electromagnets.

In yet another embodiment of the invention the motor is sealed within a case that is shaped to match the surface of a watercraft. The outer surface of the motor casing directly contacts the water and transfers heat to the water via this contact. The motor casing preferably is made from a metal. Parts of the casing in contact with the water may be at some distance from the heat producing components of the motor and the heat may be transferred to the outer surface by the casing itself, and/or through a filler material that may be present in the casing. In a preferred use, a boat hull is designed with a depression and/or opening in its hull to accept the motor with casing. The motor is mounted on the boat such that the casing forms a continuous surface with the hull except for the spot where a propeller shaft protrudes. That is, a boat hull has a depression in it that matches the size of a motor, wherein the motor has a conductive flange extension of its casing that forms a hydrodynamic surface with the hull upon mounting in the hull.

In a related embodiment a heat generating electrical device such as a MOSFET or other power controlling device is thermally connected to a surface and the assembly is mounted on or in the hull surface, allowing transfer of heat from the electrical device to the water. In a particularly advantageous embodiment the heat generating electrical device is a battery such as a metal hydride battery or other battery that generates heat upon charging and/or discharging. This embodiment of the invention is particularly useful for allowing rapid charging of electric boat batteries.

An important commercial limitation of electric boating is the time required to charge batteries. Some advanced glass mat batteries, for example, can be charged from 50% depletion in as little as 15 minutes if the heating problem were addressed sufficiently. Metal hydride batteries can charge up in very short times if cooled properly. This embodiment of the invention provides cooling for rapid charging. In one embodiment the boat hull is built with depressions below the waterline that accept the batteries. The batteries preferably are built with large conductive surfaces that contact the batteries on one side and the water on the other. Each battery/conductive surface assembly is mounted in the mull with bolts or other fasteners. A further advantage of this embodiment is that the battery weight can be placed low in the boat. Preferably the battery heat removal surface is at the side on the boat and not in a flat bottom to allow water circulation by convection as the boat will be at rest during charging from shore power.

A preferred embodiment provides a passive (thermal conduction only) or peltier (active heat pumping) based mechanism and procedure for its use that controls/adjusts the temperature of a storage battery. A battery temperature is adjusted by a peltier heat pump that is thermally attached to the battery, preferably to a metal terminal of the battery that absorbs heat from within the battery. This embodiment allows faster charging, and in some cases, better discharging through control of battery temperature. During charging the battery temperature is monitored and if the temperature is too high, at least part of the charger current is directed to one or more peltier devices to pump heat out of the battery. The peltier device preferably is connected to a heat sink and most preferably for charging watercraft batteries, is connected to a material that transfers the heat to a body of water that the watercraft is sitting in. The peltier (or a heat conducting plate, coil, matt or the like) may also be connected (i.e. physically contact, optionally through use of heat sink compound or other conductive layer) to the outside of the battery or other part of the battery. This aspect of the embodiment particularly suits lowering temperature of watercraft batteries because a great deal of heat can be easily moved from the battery to a large volume of water. In another embodiment the device is switched as needed to pump in the opposite direction and increase the battery temperature when the battery is too cold. The peltier device(s) preferably are mounted with one surface on a large hull shape conforming surface such as aluminum. A skilled artisan will readily will appreciate modification to embodiments of the invention suitable for specific boat hulls, motors and so on.

In a preferred embodiment the charger output is maintained at a high or maximum level during charging, even when the battery temperature is too high to absorb a maximum charge rate. A control circuit senses when battery temperature is too high, and automatically shifts part of the charger output to the peltier device(s) to pump heat out of the battery and into a large heat sink, such as a metal hull or a metal tube with water running through it wherein the water comes from a body of water that the watercraft is sitting in. After the battery temperature moves lower, the control circuit increases charging power to the battery. In a preferred embodiment the control is continuous and the power delivered to the battery is gradually decreased with increasing battery temperature while the power delivered to the peltier device(s) gradually increases with increasing battery temperature. This system maximizes use of the charger over prior art wherein the charger output simply is decreased to prevent overheating the battery. This embodiment of the invention takes advantage of a simple and massive heat sink (water) to allow inefficient peltier heat pumping from a battery to the heat sink, while allowing the battery charger to operate at maximum output to both cool the battery and charge at the highest rate possible.

4. Inexpensive and Convenient Electronic Steering

Many control systems for watercraft generally are complex, both in construction and in use. For example, while sometimes desired, and contemplated for some embodiments of the present invention, use of geostationary satellite signals with digital signal processing is really not necessary for automated electronic steering, in view of the fact that the earth has a very reliable magnetic field. Thus, complex equipment with maintenance, cost, and reliability concerns can be avoided by using the earth's field. Another problem arises when the user is confronted with a digital display of heading in degrees and has multiple buttons to choose from after considering the heading in degrees. Pleasure boaters often are more concerned with practical matters such as lining up a boat with a buoy and like to focus attention on the water and push a single button or switch, perhaps without having to even look down at the control panel.

In contrast, many watercraft operators desire simple controls that are easy to use without training. The operator may desire the boat to maintain a heading, but does not want to learn hot to operate an autopilot to do this. Accordingly, an embodiment of the invention provides a simple push button or toggle switch to set a boat on a heading. In an embodiment, a dash mounted switch is provided with a placard having one or a few words such as "cruise," "cruise control," "auto pilot" and the like. In another embodiment the button or switch is provided on a motor throttle handle. The control may be as simple as a rocker switch having the words "on" and "off" printed on the upper and lower respective surfaces. In an embodiment, a circuit is provided that keeps the auto pilot (steering control) on when the motor power (carburetor adjustment or electric adjustment, if for an electric motor) is increased, but turns the auto pilot off when power is decreased or turned off. In another embodiment a control circuit turns off the auto pilot when the steering is manually adjusted. In yet another embodiment a control circuit senses when the steering is manually adjusted and resets the direction after a manual correction is made. In yet another embodiment an audible signal is made when the course is reset. In another embodiment the autopilot is turned off when either steering or power is adjusted.

In a particularly desirable embodiment an auto pilot as described herein automatically engages whenever the user touches a steering wheel or other directional control. A touch switch that senses pressure may be mounted on the control and more preferably electrical conductivity from a conducting control surface to a hand is sensed (pick up of stray rf with a high impedance circuit as are known in the art). When the operator operates or contacts the control surface, the autopilot is automatically turned on. Thus, if the user is holding a steering wheel, and not turning it, the boat automatically adjusts its directional control (rudder or the like) to maintain a constant heading. In a related embodiment the auto pilot automatically turns on if the control surface is touched or moved and held for more than a set time, such as a second, two seconds, three seconds or the like, without moving it. The automated pilot would turn off or reset if the control surface is touched again or moved.

This embodiment can be built into the watercraft control circuitry and automatically activated without any further switching or decision making required by the user, and thus be a transparent part of the boat control systems. This embodiment provides true corrected steering that can compensate for temporary or permanent imbalances in directional control such as when two stern drives change thrust with respect to each other, which tends to change the directional bearing of the boat. That is, this embodiment allows a boat to stay on a straight heading despite flaws in the steering systems and despite encountering water current, waves and the like that may tend to shift heading. In a particularly desirable embodiment the control only operates above a set boat speed, such as above 5, 7, 10, 15, or 25 miles per hour, or above a set propeller speed associated with higher boat speeds. In a most preferable embodiment the control automatically activates above a set speed such as five miles per hour and turns on without the operator necessarily knowing, although a panel light may be used to signal the fact that the "corrected course" circuitry is activated. In another embodiment, a compass heading, such as an analog dial, digital display or the like may read out the instantaneous set heading utilized by the auto pilot, for the convenience of the operator.

A variety of circuits may be used to implement embodiments of the invention to allow use of the earth's magnetic field for a convenient user operated heading device. For example, a compass may be made from multiple geomagnetic field detectors that are arranged to sense when the watercraft's heading is (a) dead on, (b) slightly off center in either direction, and optionally (c) progressively more off center from a desired set heading. During use, the operator sets a heading, then the device senses whether the watercraft heading is in the selected direction, (requiring no steering control), is heading too much to the left, or is heading too much to the right, requiring course correction by momentarily or permanently altering the steering right or left respectively. The device outputs an electrical signal denoting correct heading, (or no signal meaning no correction needed), or other off center condition. In another embodiment the device senses at least two levels of off course direction for either side of the desired direction. The two or more levels indicate relative error such that a first lower level of error signal is used to make a low level (weaker) steering adjustment. A second higher level of error signal triggers a high level of steering shift and so on for successively higher error signal(s) if desired.

A very desirable way to implement a simple switch operated autopilot or auto-correction of steering that automatically engages above a set speed, is to use two or more ratiometric hall effect devices oriented at different positions so that each outputs a different signal depending on geomagnetic heading. A circuit receives the signal (or creates the signal by correct biasing) and responds to changes by outputting at least one left or right correction signal. The correction signal(s) are used to drive an actuator for changing or adjusting course. Discrete ratiometric devices type A3515 may be mounted with their sensing axes on a horizontal, or more complex sensor packages may be used. For example, Dinsmore sensor model 1525 or, more preferably model 1625 analog compasses may be obtained from The Robson Company, Inc. Erie, Pa. at low cost and provide two outputs that may be interfaced with other circuitry that detects changes in heading.

The two analog outputs from the 1625 sensor may be interfaced directly with, for example an 8-bit, 12-bit or other A/D converter, using the highly curved portions as a sector designator only, as described in the engineering diagram for this sensor (see http://www.imagesco.com/articles/1525/03.html). More preferably, the analog outputs of this sensor are used directly, and monitored for changes to determine course shifts. For example, the cosine output, which presents a fairly linear decreasing voltage from 10 to 120 degrees (region A) and a fairly linear increasing voltage from 225 to 350 degrees (region B) may be used within those regions to drive a comparator or sample and hold circuitry that responds to increased or decreased voltages by outputting a correction signal. A positive sine signal above a threshold voltage, on the other hand can be used to determine when region A is active. A negative sine signal beyond a threshold negative voltage is used to determine when region B is active. Between 350 to 10 degrees and between 120 to 225 degrees, the sine signal is used, as it is a fairly linearly decreasing voltage and increasing voltage in these two regions respectively. A skilled electronics technician can use a microprocessor, and/or simple analog devices such as comparators to switch between the four regions and sample-detect changes in course heading as changes in voltage within each region.

An explanation on how to use the 1625 analog device above is representative and other devices, including discrete hall effect devices may be used. Also, for higher cost embodiments that utilize other computer equipment, a complete high performance electronic compass sensor module such as the TCM1 or TCM2 may be purchased (see http:// www.pcweb.com/pni/TCM2.HTM) having built in sending circuitry. The output correction signal generally has to be buffered and is used to control an actuator. A variety of actuators will be appreciated, depending on the particular watercraft used. In a preferred embodiment the watercraft employs an electric motor or electric powered control surface such as a rudder. Hydraulic steering may be conveniently used for fossil internal combustion powered watercraft. For example, see the HyDrive (TM) Admiral Series of hydraulic steering units from HyDrive Engineering (http://www.coursemaster.com/Catalogue3_age.html). Also see the inboard and outboard kits from this company, which can be mated with autopilots.

A Fun to Use Analog Auto Pilot

Embodiments of the invention provide auto-pilots that allow the user to control the boat without training, without even having to look at a panel display, or in some cases, without even knowing that the autopilot exists. Inexperienced boat operators generally are familiar with compasses and how to rotate them without receiving detailed instructions. Accordingly, in a desirable embodiment that utilizes some operator movement of an analog device, the auto pilot consists of a hand manipulated knob or other dash mounted device with compass headings on the knob or on the dash. For example a dash may have a flat horizontal planar surface from which protrudes a knob 4 inches diameter with a raised center portion of 1.5 inch diameter. The knob outer and lower flat region has heading markings on it that correspond to compass headings such as north, south, east, west and so on. The dash area outside the knob has a "heading" mark at the top adjacent to the knob edge. During use the operator merely rotates the knob to the desired heading. Preferably a switch is provided which engages the autopilot as needed by push button, toggle or other action. Variations of this device, such as a touch screen that shows a compass and which allows selection by touching a desired heading may be used. A rotating knob is preferred, although touch panel, slide switch and other devices may be used. Most preferably the operator selection of heading is carried out in an analog manner (no numbers to decide on) by a hand movement such as that exemplified here. In this example the compass headings are on a rotating knob but could be on a fixed surface under the knob.

In another embodiment a simple switch, preferably push button variety is provided that allows a user to maintain the watercraft on its present heading. In this case, by pushing the switch, the user alerts the auto control circuit to lock in the present heading. The user may turn off the control by activating (ex. by pushing) the switch again.

Although an electronic steering device according to this embodiment may employ the output of multiple discrete sensors, equivalents of this embodiment may utilize other relative magnetic sensing device(s) that may be analog or digital and may comprise multiple sensing within the same device. The signals indicating error are connected electrically to an electromechanical actuator that controls a rudder or other steering device. For boats that rely on differential thrust for steering, the error signal is fed directly into the controller of the motors as suited to correct the course. This embodiment of the invention is suitable for fossil fuel powered boats and trolling motor powered boats as well as regular electric boats.

Figure 3:
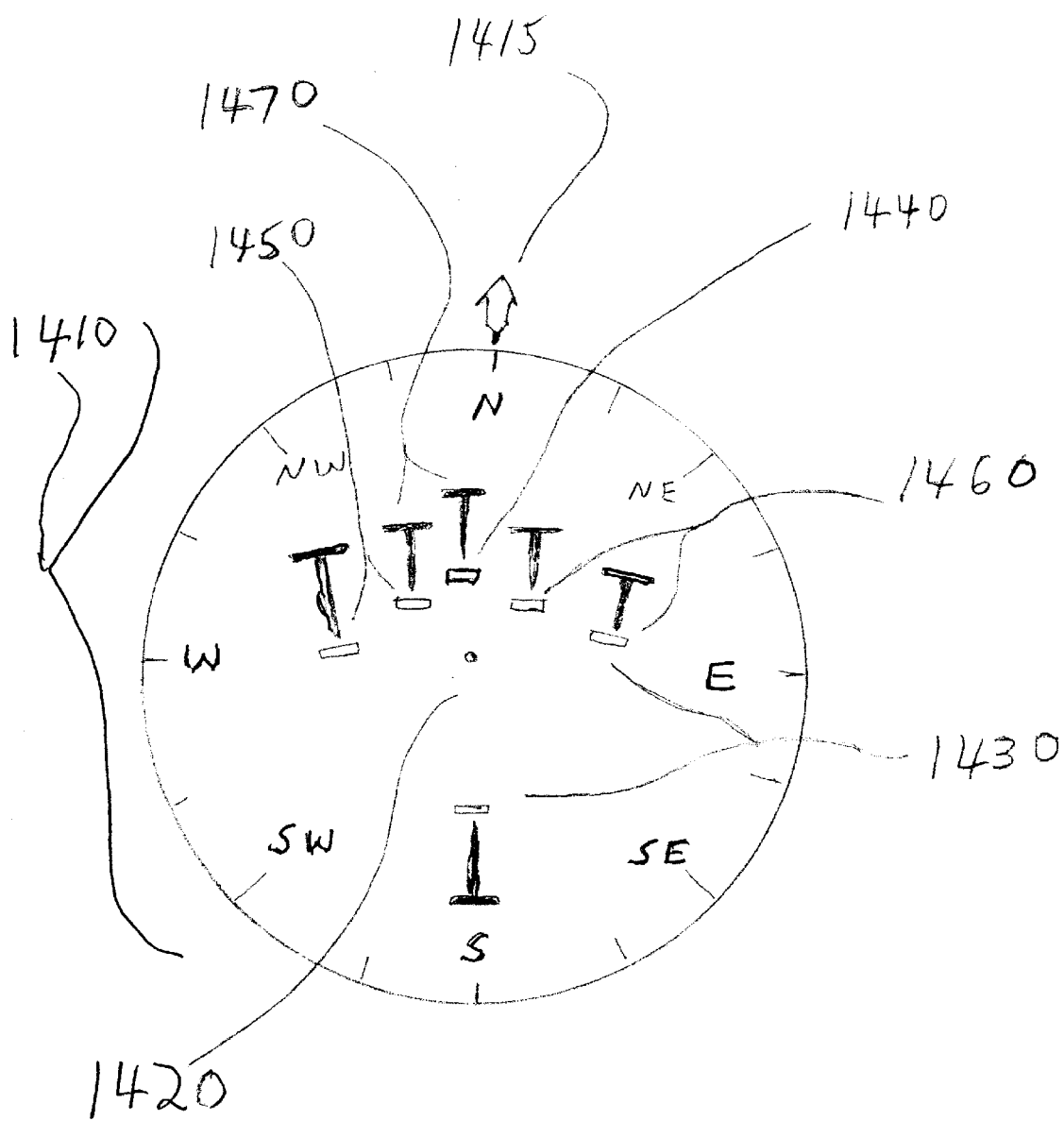
FIG. 3 shows an electronic steering device that comprises a rotating platen with 6 hall effect sensors mounted within it.

A preferred embodiment of an electronic steering device is shown in FIG. 3. Platen 1410 rotates about center 1420 by hand adjustment. The center of the platen may contain a knurled knob or protrusion for easy turning to set the desired direction, which is noted by proximity of dial 1410 markings to fixed "course heading" indicator 1415 which is a fixed mark outside the platen. This figure shows an inexpensive embodiment that uses five discrete hall effect sensors, which are shown as 1450, 1440 and 1460 in the figure but which are affixed to the underside of the plate. Signal amplifying circuitry may exist in the rotatable platen, wires from the platen exit out the rear and are connected to further circuitry to effect steering changes. In this simple "hard wire" method it is preferred that the platen rotate only plus and minus 180 degrees from a set point in order to prevent over twisting of the wires.

FIG. 3 also shows center origin detector 1440 that is used to define a reference magnetic north. The platen contains two more magnetic north sensors 1450 that are oriented (pointed) progressively more to the left of the center origin detector 1440, and two more sensors 1460 that are oriented progressively more to the right. For the sake of explanation, FIG. 3 shows sensors 1450 and 1460 positioned to the left and right of origin detector 1440 respectively, but in practice, the sensors can be placed anywhere on the platen as long as they are facing slightly left and right of the center origin detector, respectively and are fixed in position with respect to detector 1440. By way of example, the first sensor on the left may be positioned so it faces (points) 15 degrees to the left of center, the second sensor from the left is then positioned to face 7.5 degrees to the left of center and the third sensor is positioned to face center (straight up as shown). The fourth sensor then is positioned to face 7.5 degrees to the right of center and the fifth is positioned to face 15 degrees to the right of center. By "positioned" is meant that the sensor is positioned so that its input is oriented in the desired position, which for a typical hall sensor is perpendicular to the center of the marked flat side. Although not shown here, a circuit for implementing a "simple switch" to lock in a present heading may be implemented by using multiple hall effect sensors (preferably at least 2) arranged in a pattern. By providing signal outputs at all directions the circuit can monitor deviation from a present course setting at all positions of the platen. In fact, this embodiment of the invention may be implemented without a rotating device.

An optional sensitivity enhancer 1470 may be positioned in front of each magnetic field detector. The enhancer is a paramagnetic elongated device that may take shape of a nail and which focuses magnetic field lines to an axis in front of the magnetic field detector to improve sensitivity. The end of the enhancer away from the hall effect device preferably is larger and the end towards the enhancer is pointed, with the diameter of the constricted end approximating the diameter of the sensor chip to facilitate focusing of magnetic field lines into the sensor. In equivalent embodiments where multiple hall sensors are positioned within the same chip but facing at slightly different angles from a center reference, such sensitivity enhancers may be added to the chip as elongated paramagnetic depositions of iron, nickel chromium and the like extending out from the sensitivity spot for paramagnetic device(s) within the chip.

The inventor prefers large discrete hall effect devices and particularly, discrete ratiometric hall effect sensors, however, because they are more easily used with large enhancers such as inexpensive low carbon steel nails with sharp points for greater sensitivity. This figure also shows N, S, E, W (etc.) markings. Those markings indicate the desired heading, but become the true heading when the boat is on proper course, as detected by a signal produced from center detector 1440 and decreased or absent left and right error signals, respectively from sensor groups 1450 and 1460. In one embodiment of operation, a user rotates the platen until the device indicates that true north has been detected, and at this point the compass heading adjacent to mark 1415 is the true course heading.

FIG. 4 shows a representative block diagram outline for implementation of a particularly robust automated electronic steering device that may be built from easily obtained discrete hall effect sensors from an electronics parts vendor. The five hall effect sensors 1510 on the left side of this figure are discrete ratiometric hall effect sensors such as type A3515. These are biased to produce signals in response to magnetic fields. Each signal from a hall effect sensor is separately amplified by buffer amplifiers such as MOSFET operational amplifiers 1520 which feed logic chips in control circuit 1530 that produce digital signal output(s) in response to the detection of magnetic north by each hall effect sensor and control motor 1550. In an embodiment not shown here, the amplifier/buffer circuitry, which may be as simple as a transistor amplifier, is built into the hall sensor chip. In another embodiment, two or more sensors are present within the same chip.

A signal may arise to denote any of several conditions. A "course OK" logic signal may come from detection of a sensed magnetic north signal from the center origin detector hall effect sensor. A "slight correction to the right needed" signal may arise from a sensed magnetic north signal detected from the "small left sensor" device that is positioned to face slightly (typically between 2 to 15 degrees, preferably 3 to 8 degrees) to the left of the center origin detector. A "stronger correction to the right needed" signal may arise from a sensed magnetic north signal detected from the "large left sensor" device positioned to face more (typically between 3 to 30 degrees, preferably 5 to 20 degrees) to the left of the center origin detector. Analogous correction signals are determined from the small and large right sensors, and/or other sensors that may be positioned in other orientations. In some embodiments the control signals may not be discrete digital signals but rather analog signals, and are treated in like manner by control circuitry.

In a simplified version of this embodiment, only three hall effect sensors are used, in which case only one kind of correction signal is produced from the control circuit for each side. In another embodiment a large number of sensors are used and their outputs compared either in hardware or by operation of a computer program to decide on how to correct the heading of the watercraft. In yet another embodiment, analog outputs from multiple sensors, either within the same chip, or in different chips, are blended, by summing, comparing, or otherwise as a skilled artisan may readily achieve, before obtaining a control signal to the motor(s).

In one embodiment an additional sensor is used facing substantially away (preferably 180 degrees away) from the center origin detector sensor. A signal produced from the additional sensor indicates that the watercraft has turned around, and needs to be re-oriented. In that case, the control circuit may determine which direction the watercraft has rotated from stored information regarding which error sensor(s) (left or right from center) were activated last. A suitable correction, and or audible alarm to notify the watercraft occupants can be automatically outputted by the control circuit.

The control circuit produces a large electrical pulse or continuous signal to control or directly power at least one motor to effectuate a course change. The motor may be a servo mechanism, solenoid, or other device for adjusting a rudder or steering wheel. The "motor" may consist of two motors that are separated such as floating skis motors and which steer the craft by virtue of their relative power outputs. At least some of the control circuit may be a computer and carried out by software. While implemented easily in many electric propulsion systems such as electric boats powered by batteries or fuel cells, these embodiments also may be used and are intended for internal combustion powered boats. For example, where two stem motors are used (one to the port side, on to the starboard side), the fuel rate of supply to both can be modulated to achieve turning. A rudder can be manipulated, a steering wheel can be servo controlled, and the like.

In operation, a user turns the platen until a desired heading (0 to 360 degrees of the compass, preferably displayed at the edges of the round platen that contains the sensors) is selected. Preferably the platen compass markings indicate "N" at the center origin sensor detection line, and an adjustment for true magnetic north deviation is built into the platen. Also, course indicator line or other marking 1415 in FIG. 3 should be placed on a surface about which the platen rotates and is used as a set point that lines up with the desired compass markings on the rotating platen.

After setting the platen to a desired heading the device is actuated and steers the watercraft until automatically or manually turned off. For the example shown in FIGS. 3 and 4, there are two modes of operation. In a first mode called "new course setting" the user turns the platen to a desired heading. The control circuit then starts to determine whether any of the hall effect sensors are activated. If a sensor is activated, the control circuit responds by a programmed or set response as exemplified above. For example, if the large right sensor alone is activated, then the control circuit adjusts the watercraft to turn more to the left. More likely, when only 5 or 6 sensors are used, no sensor will be activated upon turning the "new course setting" mode on, in which case the control circuit turns the watercraft in a sharp circle to one side or the other until one of the sensors is activated and a regular response such as described above can be activated. In a second mode setting called "maintain present course" the user turns the platen until the center origin detector is activated, by, for example a light readout and/or audible beep indicator, and the device maintains the course as described. That is, once the watercraft departs from the desired heading one or more hall effect sensors activate and turn on one or more effectors 1540 shown in FIG. 4, which may for example be a rudder, propulsion motor control or alarm.

A concern when designing an using geomagnetic auto pilots such as those described herein, is that the hall effect device works best when positioned within a certain attitude range with respect to the horizon. Unfortunately, a watercraft tips forward and back and left to right in the waves. If a geomagnetic sensor of the invention such as a hall effect sensor is tilted off vertical, it begins to sense some of the vertical component of the earth's field, which may introduce some error. For practical purposes, up to approximately 12 degrees of tilt, as with any compass, is acceptable for many of these devices. However, the boat may suddenly lurch, which may confuse a sensor. Partly for this reason, the sensors, their circuitry or even software (when used) can accommodate temporary deviations by a variety of mechanisms as are known to skilled artisans. For example, sensor packages such as 1525 and 1625 have built in damping so that the indications are similar to those of a standard liquid-filled compass. That is, if a signal reading is suddenly altered corresponding to a 90 degree change in heading, it will return to proper indication in 2.5 to 3.5 seconds, with no overswing. In desirable embodiments the responsive control and/or output circuitry and or software (if used) utilizes a response time constant long enough to accommodate these changes. In another embodiment, any sudden change above a set threshold value (e.g. change in voltage per unit time) will be ignored and the sensor output is re-read a short period later. This accommodates (is resistant to) such short term perturbations.

In another desirable embodiment the regular acceptable tilt range of about 12 degrees is increased to 15, 18, 20 or more degrees by electrically coupling sensors in parallel that are held in alternative positions with respect to the horizon. This can be achieved for example by summing analog outputs into a discrete summing buffer or amplifier subcomponent of a circuit. In yet another desirable embodiment a paramagnetic material such as iron with an expanding vertical aspect is positioned in front of a hall effect sensor to help gather magnetic lines of force more in a vertical dimension. Sensitivity enhancers 1470 shown in FIG. 3 desirably have a broader acceptance angle for magnetic fields and can be more immune to the effects of tilt. More preferably the sensitivity enhancers are solid cone shaped rather than having flat heads.

It was discovered that in many types of uses, tilting of a watercraft left and right, in response to waves is a particularly, and more common source of possible error. Accordingly, in a particularly desirable embodiment a tilt detector is fixed to the watercraft body to sense when the watercraft tilts left or right. The tilt sensor output can be used to detect when the boat has exceeded a tilt angle and can block the auto pilot from taking action from an erroneous deviation in heading caused by the tilt. In sophisticated embodiments, the tilt detector output may activate a software subroutine for correcting the effect of tilt or even activate detection from alternative geomagnetic sensors that are fixed at the alternate tilts and which are (at least momentarily) more correctly positioned at the horizon, as determined by the tilt detector. In another embodiment, the tilt detector detects tilt fore and aft. In yet another embodiment the problem of tilt is alleviated by isolating the geomagnetic sensor from extreme tilt by floating the sensor in a fluid. In the latter case thin flexible wires may attach to the sensor to allow movement. Alternatively, for an embodiment that addresses sideways tilt, the sensor is pinned on an axis that is parallel to the keel (or longest dimension of the boat), allowing the sensor to at least partially float along that axis, preferably on a spring mechanism that may be adjusted to set a normal position.

The contents of all publications, patents and patent applications listed herein specifically are incorporated by reference in their entireties. Priority application Ser. Nos. 09/877, 196 filed Jun. 11, 2001 entitled High speed electric watercraft now U.S. Pat. No. 6,532,884 issued Mar. 18, 2003;" 60/349,375 filed Dec. 22, 2001 entitled "Efficient motors and controls for electric watercraft;" 60/302,647 filed Jul. 5, 2001 entitled "Electronic propeller guard for electric boats;" and 60/296,754 filed Jun. 11, 2001 entitled "Monitoring and control of electric watercraft propulsion efficiency" are incorporated by reference in their entireties.

I claim:

1. An electronic control for enhancing the efficiency of an electric motor driven electric watercraft propeller drive comprising:
    a) a motor current measurement signal corresponding to propeller torque;
    b) a motor voltage measurement signal; and
    c) a comparator for monitoring the current and voltage signals,
    wherein the controller limits voltage to the motor upon sensing an overly high increase in motor current upon increasing motor voltage.

2. The electronic control of claim 1, wherein the overly high increase in motor current is more than 25% higher than the increase seen at low boat speed measured between 10% and 70% of the hull speed.

3. An electronic control device that controls propeller slip of an electric motor powered watercraft, comprising:
    a) a detector of propeller speed;
    b) a detector of the watercraft's speed, and
    b) a circuit that controls power to the armature of the motor, a field winding of the motor or both,
    wherein a signal from the detector actuates the circuit to adjust propeller slip according to a predetermined relationship between propeller and boat speed.

4. An electronic control device as described in claim 3, wherein the detector is selected from the group consisting of a motor speed detector, voltage input to the motor, an optic or magnetic sensor of propeller speed and a computer that monitors power and time to estimate approximate speed.

5. A watercraft that contains an electronic control device as described in claim 3.

6. An electronic control device as described in claim 3 wherein the circuit decreases power to the motor when the propeller speed exceeds a predetermined limit for a given boat speed.

7. An electronic control device as described in claim 3, wherein the predetermined relationship between propeller and boat speed is a single value for all boat speeds.

8. An electronic control device as described in claim 3 further comprising at least a second control condition that increases the allowable propeller slip to provide higher slippage for greater acceleration.

9. A simplified heading cruise control for a watercraft, comprising:
    a) one or more ratiometric output geomagnetic sensors mounted to the watercraft and that output one or more analog signals that correspond to geomagnetic heading;
    b) a circuit that analyses the signal(s) from the one or more geomagnetic sensor(s) to output one or more correction signals for altering course; and
    c) a maximum of one on/off switch on the watercraft required for activating the cruise control.

10. A simplified cruise control for a watercraft as described in claim 9, further comprising a propeller speed or boat speed signal that automatically turns on the heading cruise control upon exceeding a set speed to allow automatic heading correction at higher cruise speeds.

11. A simplified heading cruise control as described in claim 9, further comprising a switch mounted on at least the motor throttle or steering wheel control, wherein activation of the switch turns the heading cruise control on or off.

12. A simplified heading cruise control as described in claim 9, further comprising a rotating knob for directly setting a desired course, wherein the one or more ratiometric output geomagnetic sensors are attached to the rotating knob and rotate with the knob.

13. A simplified heading cruise control as described in claim 11, wherein the switch is a body capacitive switch that is activated upon electrical contact between skin of the watercraft operator and the throttle or steering control.

14. A simplified heading cruise control as described in claim 9, further comprising a control circuit that turns off the cruise control when the steering is manually adjusted.

15. A simplified heading cruise control as described in claim 9, wherein the maximum of one on/off switch is mounted on the dash.

16. A simplified heading cruise control as described in claim 9, further comprising a control circuit that senses when the steering is manually adjusted and resets the direction after a manual correction.

17. A simplified heading cruise control as described in claim 16, further comprising a circuit component to create an audible signal when the course is reset.

18. A watercraft comprising the simplified heading cruise control of claim 9.

19. A simplified heading cruise control as described in claim 10, wherein the set speed is at least 5 mph.

20. A simplified heading cruise control as described in claim 9, further comprising a panel light to indicate when a corrected course circuitry is activated.

21. A simplified heading cruise control as described in claim 9, further comprising an analog dial or digital display to read out an instantaneous set heading.

22. A simplified heading cruise control as described in claim 9, comprising a rotatable knob with heading marks thereon to indicate direction.

23. A simplified heading cruise control as described in claim 9, further comprising at least one of a tilt sensor, a microprocessor with software for correcting the effect of tilt, alternative geomagnetic sensors that are fixed at alternative tilts with respect to the horizon, and a fluid suitable for floating the geomagnetic sensor.

24. A non-mechanical electronic control system for inhibiting cavitation of a propeller driven electric powered watercraft, comprising:
  a) a boat speed monitor comprising a piezo electric transducer located at a surface of the boat hull in contact with water; and
  a) a control circuit,
  wherein the control circuit monitors motor voltage as an index of propeller speed and decreases motor power when the motor voltage is too high for a given boat speed.

25. A non-mechanical electronic control system as described in claim 24,
  wherein the control circuit contains a microprocessor look up table of motor voltage versus boat speed values for use in determining when to lower motor power.

26. A non-mechanical electronic control system as described in claim 24,
  wherein the control circuit contains a microprocessor look up table of motor power versus boat speed values for use in determining when to lower motor power.

27. A non-mechanical electronic control system as described in claim 24,
wherein the piezo electric transducer is made from a piezo film.

28. A watercraft battery heat removal system for moving heat between a battery and water that the watercraft sits in, comprising:
  a) at least one battery with metal terminals;
  b) a heat conducting connector that physically contacts one or more of the battery terminals and receives heat from such one or more terminals; and
  c) a material that accepts heat from the heat conducting connector and transfers the heat to the body of water;
  wherein the one or more metal terminals contacts the heat conducting connector, the heat conducting connector contacts the material of c) and the material of c) contacts the body of water.

29. The heat removal system of claim 28, wherein the battery is an advanced glass mat battery.

30. The heat removal system of claim 28, wherein the heat conducting connector comprises at least one of a peltier device, heat conducting plate, coil, and a matt.

31. The heat removal system of claim 28, wherein the material that accepts heat from the heat conducting connector is at least one of a large hull shape conforming surface, a metal hull and a metal tube with water running through it.

32. The heat removal system of claim 28, wherein the material that accepts heat from the heat conducting connector is a metal hull.

33. The heat removal system of claim 28, comprising a peltier device that is thermally connected to a battery terminal, wherein the peltier device is within a circuit that switches the peltier as needed to pump heat into the battery as well as out of the battery.

34. A watercraft that comprises the watercraft battery heat removal system of claim 28.

35. The heat removal system of claim 28, further comprising a battery charger.

36. The heat removal system of claim 35, wherein the battery charger comprises a control circuit and a peltier device that connects to a terminal of a battery to be charged, wherein the control circuit senses when battery temperature is too high and automatically shifts power to the peltier to pump heat from the battery.

37. The heat removal system of claim 35, wherein after the battery temperature moves lower, the battery charger increases charging power to the battery.

* * * * *